Aug. 22, 1933.  R. N. RIBLET  1,923,459
WINDOW OPERATOR
Filed Jan. 12, 1933   3 Sheets-Sheet 1
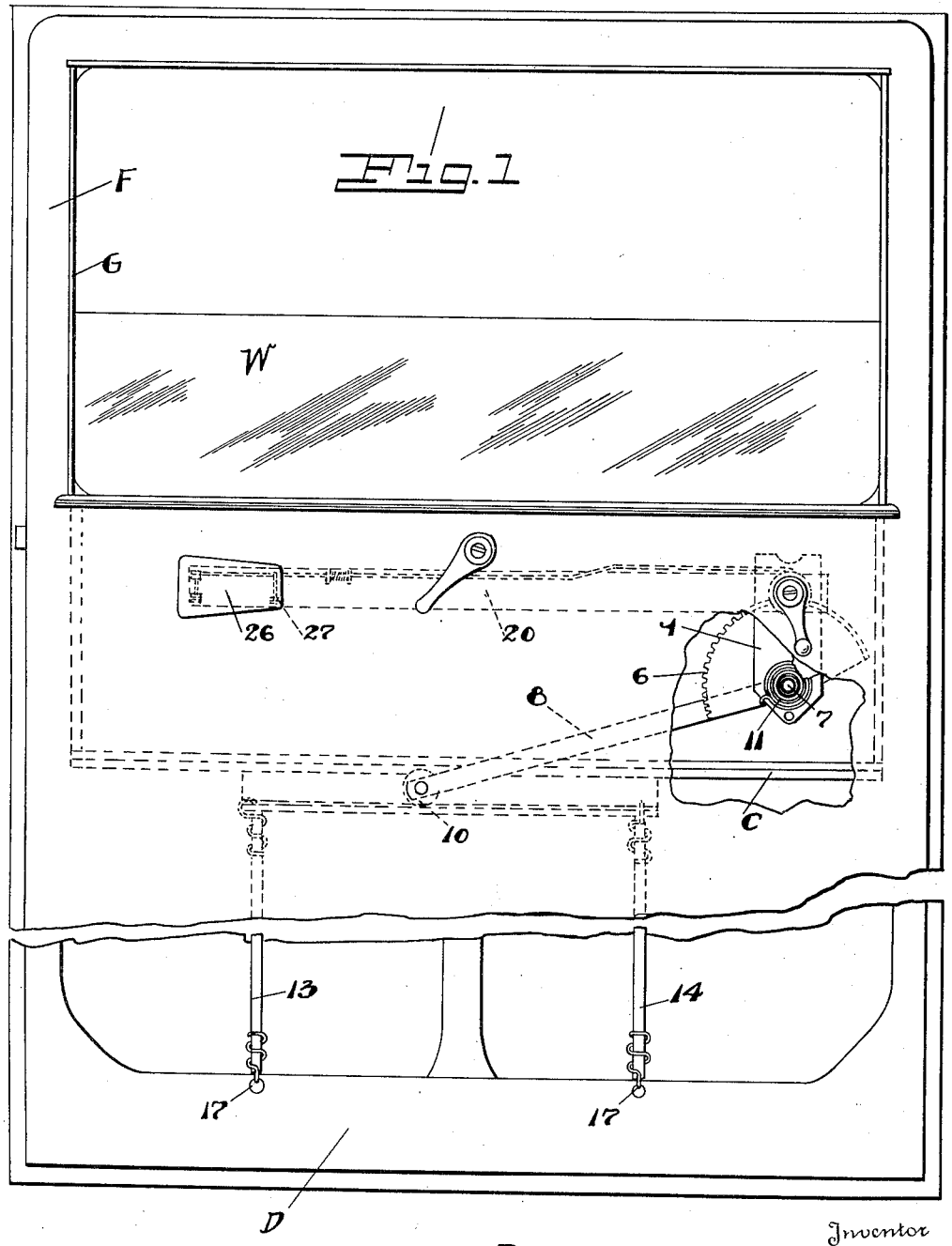
Inventor
ROYAL N. RIBLET
By Herbert E. Smith
Attorney

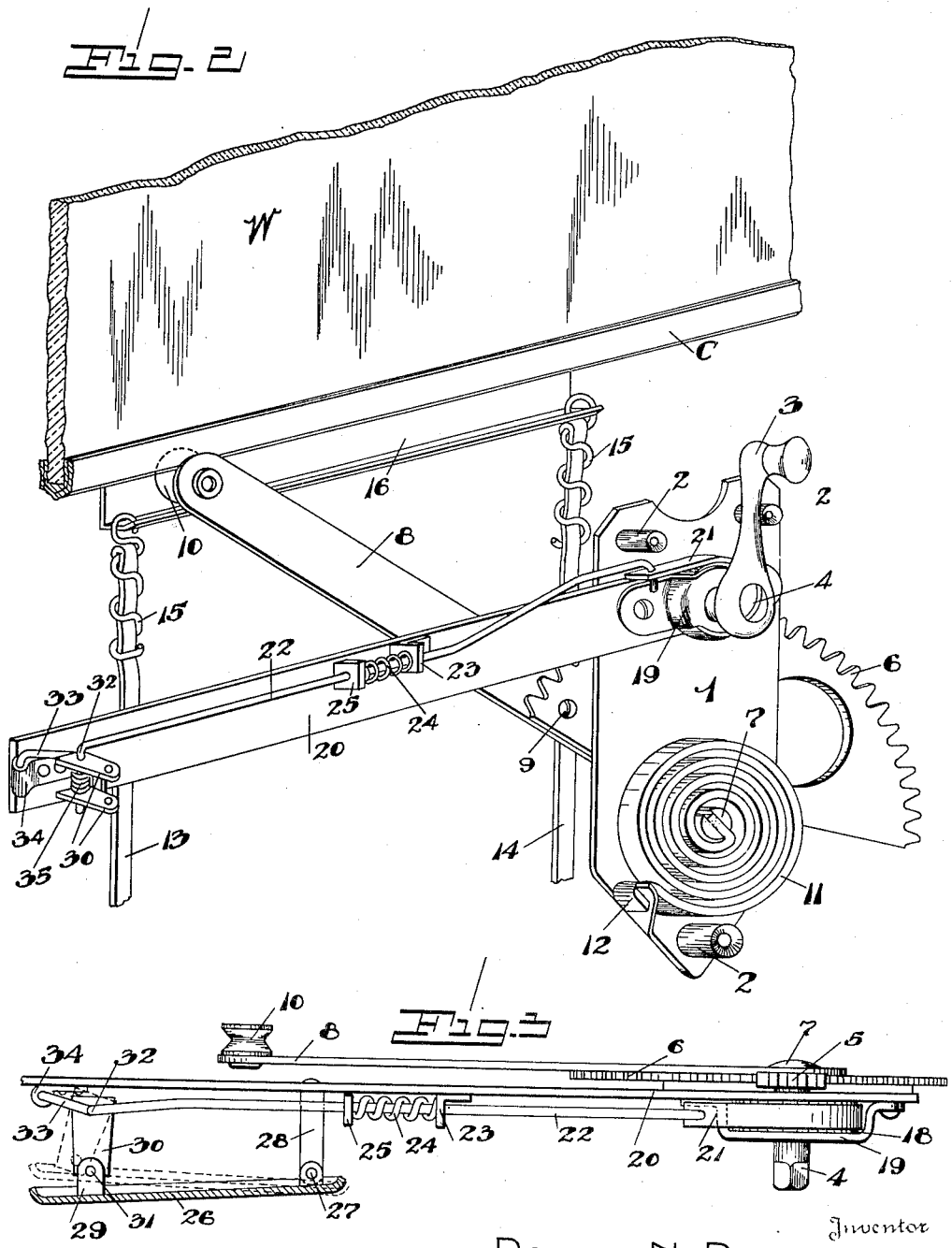

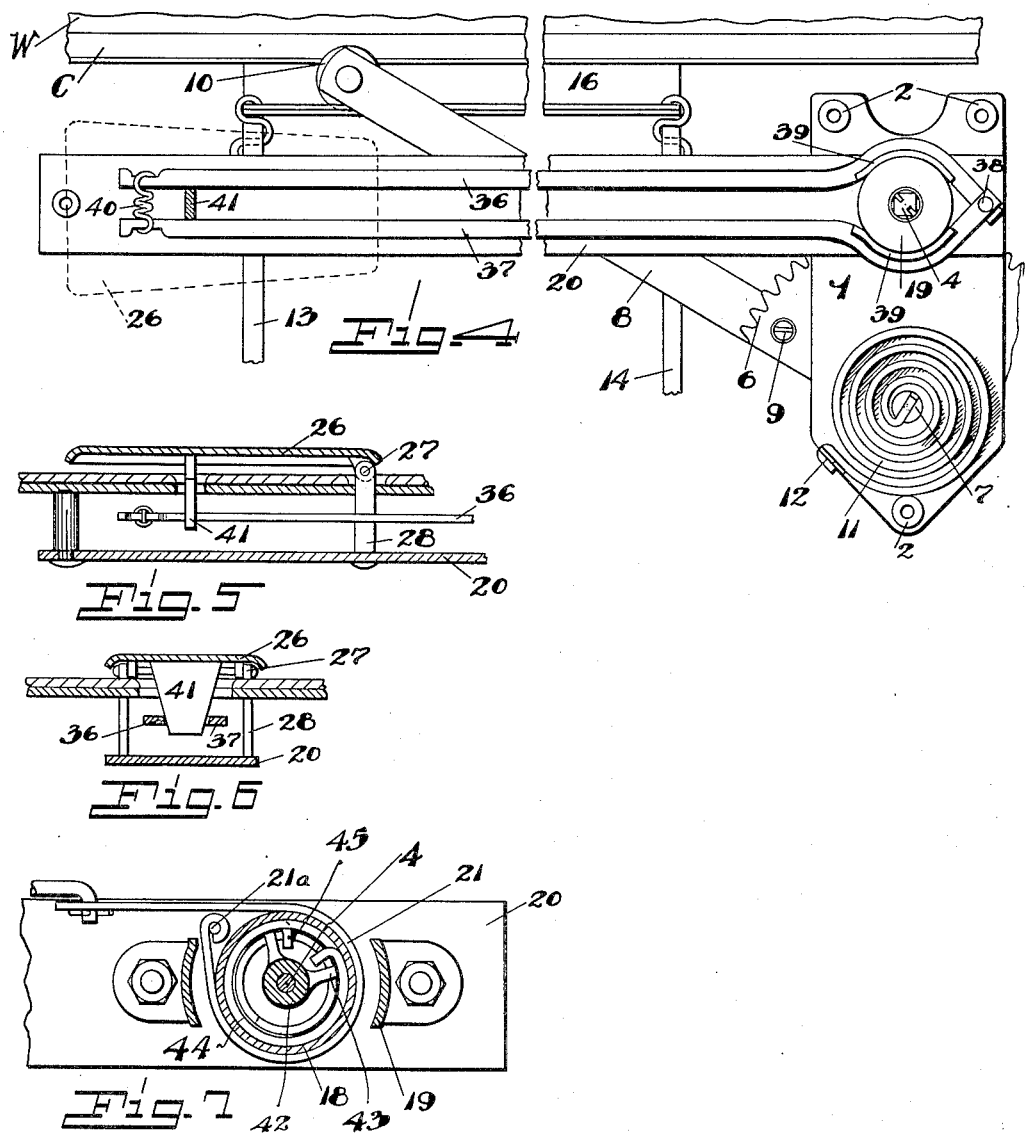

Patented Aug. 22, 1933

1,923,459

UNITED STATES PATENT OFFICE 1,923,459

WINDOW OPERATOR

Royal N. Riblet, Spokane, Wash.

Application January 12, 1933. Serial No. 651,377

4 Claims. (Cl. 268—126)

My present invention relates to improvements in window operators of the rack and gear type for raising and lowering vertically reciprocating windows. While the operating mechanism of my invention may be adapted to and employed in connection with various types of windows or other reciprocable devices, it is especially designed for use in connection with the window of an automobile or motor vehicle that is located adjacent the driver's seat, at the left hand side of the car, and usually in the front left-hand door of the vehicle. By the utilization of the manually controlled window operating mechanism, the window may be raised and lowered in the customary manner, and in addition, I provide a friction device, in the nature of a brake or clutch, that co-operates with the window operating mechanism to steady and stabilize the movement of the mechanism and of the window when operating under ordinary conditions. Means are provided for releasing the clutch or brake whereby, in an emergency, the window may be dropped by gravity and with the assistance of tension operated means, to open position. Thus, assuming that the window is in raised or closed position, and that the driver of the car desires to extend his left hand and arm through the window-opening for the purpose of giving a traffic signal, the driver may, through pressure from his elbow, release the clutch or brake, thereby permitting the window to automatically drop to open position, leaving the window opening clear of all obstructions.

In carrying out my invention the window operating means or mechanism is provided with means properly adjusted under tension to pull down the window to open position, but the brake mechanism is operative under normal conditions to resist and withstand this tendency of the tension device or devices, thereby equalizing the up and down pulls on the window, and permitting the usual crank, rack and gear to raise and to lower the window.

The invention consists in certain novel combinations and arrangements of parts involving the operating mechanism, the friction brake, and the automatically-operating window-opening means, as will hereinafter be more fully pointed out and claimed. In the accompanying drawings I have illustrated one complete example of the physical embodiment of my invention wherein the parts are combined and arranged according to one mode I have thus far devised for the practical application of the principles of my invention. A modification is also shown of the brake device and the release mechanism therefor, and it will be understood that other alterations and changes may be made in the exemplified structure, within the scope of my appended claims, without departing from the principles of my invention.

Figure 1 is a view in elevation at the inner side of an automobile door which is partly broken away for convenience of illustration, with the window in partly lowered position, and showing some parts in dotted lines.

Figure 2 is a perspective view of the operating mechanism equipped with the brake device of my invention, parts being omitted for convenience of illustration.

Figure 3 is a top plan view of the operating mechanism of Figure 2, and showing also the presser plate for actuating the release device of the brake.

Figure 4 is a view in elevation of the window operating mechanism with a modified form of brake applied thereto.

Figure 5 is a horizontal sectional view through the presser plate for actuating the release device of the brake of Figure 4, and Figure 6 is a detail, transverse sectional view of the device of Figure 5.

Figure 7 is a detail sectional view of the brake drum and brake shoe employed in both of the illustrated forms of the invention.

In order that the general arrangement and relation of parts may readily be understood I have indicated the front left-hand door as D customarily used in an automobile, which is provided with the glass plate or window W that is to be vertically reciprocated in the guides G of the window frame F. The glass window is provided with the usual bottom rail or bar C in the form of a channel iron that is rigidly secured to the lower edge of the window. The window is adapted to be raised to closed position and lowered to open position in well known manner, and when in the lowered position the window is enclosed in the usual pocket provided therefor in the door structure. Within the hollow door structure is secured the base plate 1 that is secured by screws or bolts in the bosses 2 and firmly affixed with relation to the door. A crank shaft 4 is journaled in the base plate and the crank 3, which is located exterior of the upholstery or outer covering of the door, is readily accessible to the driver of the car for turning to raise and lower the window. The crank shaft is provided with a gear or pinion 5, and the latter meshes with an arcuate rack or rack plate 6 which is rigidly mounted on the rack shaft 7, and the latter is journaled in bearings in the base plate, in order that the window may be raised by turning the crank handle anticlockwise, and lowered by turning the crank handle clockwise.

The segmental or arcuate rack plate 6 is provided with a rigid lever arm 8 that is secured to the plate as by screws 9, and this lever remains positioned below the window at all times, while the anti-friction roller 10 at the free end of the lever engages with and rolls along the under edge of the channel bar C of the window as the latter is raised and lowered.

An equalizing and cushioning spring 11 is provided for the window, which spring is wound under tension as the window is lowered and thereby acts as a cushion to prevent sudden stopping of the descent of the window. This spring is coiled about the rack shaft 7, with one end secured to the shaft, and its outer end anchored at 12 to a part of the base plate 1, and it will be apparent that as the window is raised and the shaft 7 turns, the uncoiling of the spring assists in lifting the window to some extent.

For use in steadying the upward movement of the window as it is closed, and for imparting a quick downward movement to the window when it is to be lowered, either in the usual manner, as when the handle 3 is turned, or when the window is permitted to drop by gravity as will be described, I employ a pair of elastic straps 13 and 14, located below the window and spaced a suitable distance apart. These elastic straps are connected at 15, as by wires, to an angle iron bracket 16 which is rigidly attached, as by welding, at the under edge of the channel iron bar C of the window, and at their lower ends these straps are anchored at 17 to a part of the frame of the door D. As the window is raised by turning the crank 3, it will be apparent that the elastic straps are stretched and placed under tension, and at the same time the uncoiling action of the spring 11 assists in elevating the window. Thus, when the window is in raised position, the spring 11 is substantially inert, while the two elastic straps 13 and 14 are stretched taut and under tension, and, if the window is unsupported or free to drop, these straps impart an initial quick movement to the gravity-drop of the window.

The impetus or momentum of the dropping window is checked and the movement of the window is cushioned as the tension of the elastic straps decreases, by the coiling action of the spring 11, which spring is wound upon itself as the shaft 7 turns anticlockwise. As the window drops, the arm 8 is turned down, causing the turning movement of the segmental rack to wind the spring 11, and incidentally the pinion 5 and crank 3 are also turned, as the spring 11 is coiled and thereby absorbs the dropping movement of the window. The spring 11, of course, is wound upon itself or coiled, when the window is opened by turning the crank 3 as well as when the window is "dropped" by the action of gravity with the assistance of the tension or elastic straps 13 and 14.

In combination with the crank shaft or power shaft 4 of the operating mechanism, I employ a friction brake device that includes a brake drum 18 rigid with the shaft, which drum is enclosed in a housing 19 forming a journal bearing for the shaft and secured, as by screws, to a horizontally disposed supporting arm 20 that is rigidly attached to the plate 1.

A circular brake band 21, which is anchored at 21a to the arm 20, encircles the drum for frictional contact therewith, and it will be understood that the band normally engages the drum with sufficient friction to hold the drum and its shaft 4 against turning, except when the shaft is turned by manipulating the crank 3. Thus, the band is adapted to hold the window at any desired height, due to its frictional engagement with the brake drum, and the usual manual force must be exerted on the crank arm or handle 3 to raise or lower the window.

A wire rod 22 is attached to the free end of the brake band, and this rod, which extends alongside of the supporting arm 20, is supported to slide in an angle bracket 23 that is mounted on the supporting arm. A spring 24 is coiled about the wire rod, and interposed between the bracket 23 and a block, or nut 25 rigidly mounted on the rod, and it will be apparent that the function of the spring is to exert its tension on the block 25 and thus pull the brake band into frictional contact with the brake drum.

Thus it will be apparent that as the spring 24 pushes the wire rod 22 to the left in Figure 2 to engage the brake device for the crank shaft, when the rod is pushed to the right, the band is disengaged from the drum. For this latter movement I employ a presser plate or release plate 26, which, as indicated in Figure 1 is supported exterior of the upholstery or inner covering of the door, and is located in position where it is readily accessible for pressure from the elbow of the left arm of the driver of the car.

The presser plate is hinged at 27 on a bracket arm 28 that is rigid with the supporting arm 20, and the free end of this hinged plate is provided with a pair of vertically spaced lugs 29 to which a pair of horizontally disposed links 30 are pivoted or hinged at 31. The bent end of the wire rod 22 is also hinged in these two links, and the latter are also hinged to a swinging arm 33 that is hinged at 34 on the supporting arm 20, a spring 35 being coiled about the hinge joint 32 and adapted to exert its tension for normally holding the swinging arm 33 and the wire rod 22 out of alinement as indicated in Figure 3. Thus, it will be apparent in Figure 3, that as the free end of the presser plate 26 is pressed inwardly toward the supporting arm 20, the flexure or bend between the rod 22 and the swinging arm 33 will be straightened, and as the swinging arm is anchored at 34, the wire rod is compelled to move to the right in Figures 2 and 3, and thereby release the brake band from its drum. When the brake is thus released, the window "drops" as has heretofore been described.

In Figures 4, 5, and 6, a modified form of the brake device is illustrated in connection with the drum 18 and shaft 4, and the presser plate 26. In this form of the brake device two vertically spaced and horizontally disposed arms 36 and 37 are employed, with short lever arms pivoted together at 38 at one side of the brake drum, and these lever arms, which are curved or arched about the drum, are provided with friction shoes 39 adapted to engage the upper and lower parts of the periphery of the drum. The pivot 38 at one end of the brake arms is supported on the supporting arm 20, and the free ends of these brake arms are joined by a tension spring 40 that exerts its tension to draw the two arms together and thus cause frictional engagement of the brake shoes with the brake drum. The spring 40 in Figure 4 performs the same function as the spring 24 in Figures 2 and 3, i. e. it holds the shoes 39 normally in frictional engagement with the brake drum to hold the window in adjusted position, but the tension of the spring 40 is overcome by power exerted to turn the crank 3.

For the purpose of releasing the friction shoes 39 from contact with the drum, and thereby permit the window to drop, the spring-connected ends of the arms 36 and 37 are spread apart by means of a spreader or wedge 41 mounted rigidly on the inner side of the presser plate and disposed between these two arms. Thus it will be apparent that as the free end of the presser plate is pressed inwardly on hinge 27, the wedge 41 is forced to move between the two arms and thereby separate or spread the arms sufficiently to release the brake shoes from the drum.

By use of the novel construction shown in Figure 7 I am enabled to eliminate the necessity of cranking the window up or down against the friction between the drum 18 and the friction band 21 by loosely mounting the brake drum on the shaft 4 and substituting therefore the rigidly mounted collar 42 having the outstanding ears 43 to engage the in-turned ends 45 of a coil spring 44, the outer coils of which serve as a brake surface against the inner or internal face of the drum. When the shaft 4, to which the operating handle is fixed is turned in either direction, one of the ears 43 will engage one of the inturned ends of the spring serving to contract or reduce the diameter of the spring coil and release the necessity of turning the drum and absorbing the friction between the drum and its brake band.

When the ears 43 no longer engage the spring ends normal expansion will insure a rigid frictional engagement between the drum and its shaft.

Having thus fully described my invention, what I claim as new and desire to secure by Letters Patent is:

1. The combination with a vertically reciprocable window, a pair of elastic straps connected with the window and placed under tension when the window is raised, operating means for reciprocating the window, and a coiled spring co-operating with said operating means and placed under tension as the window is lowered, of a brake device normally co-acting with the operating means, and means for releasing said brake device to permit automatic lowering of the window.

2. The combination with a vertically reciprocable window, a pair of elastic straps under tension for imparting an initial downward movement to said window, and a coiled spring adapted to be placed under tension during the downward movement of the window, of operating means for the window and power transmission means between said operating means and said coiled spring, a rotary brake drum co-operating with said operating means, a supporting arm, a brake band on the drum, a wire rod slidably supported on the arm and connected with said brake band, a spring co-operating with the rod to hold the band on the drum, a presser plate, and linkage connections between the plate and wire rod for releasing the band from the drum.

3. The combination with a window operating mechanism including a rotary shaft and a brake drum on the shaft, of a brake band for the drum, a spring actuated rod connected to said band, a swinging arm, a hinged presser plate, a pair of links pivoted on said presser plate, and pivotal connections for said swinging arm and rod on said links whereby the presser plate may be actuated to permit automatic lowering of the window.

4. The combination with a vertically reciprocable window, means connected with the window and placed under tension when the window is raised, operating means for reciprocating the window, means co-operating with said operating means and placed under tension as the window is lowered, of a brake device normally co-acting with the operating means, and means for releasing said brake device to permit automatic lowering of the window.

ROYAL N. RIBLET.